United States Patent
Moriguchi et al.

[11] Patent Number: 5,942,139
[45] Date of Patent: Aug. 24, 1999

[54] CONSUMABLE ELECTRODE DC ARC WELDER

[75] Inventors: Haruo Moriguchi, Itami; Kenzo Danjo, Soraku-gun; Shigeru Okamoto, Hirakata; Atsushi Kinoshita, Osaka, all of Japan

[73] Assignee: Sansha Electric Manufacturing Company Limited, Osaka, Japan

[21] Appl. No.: 09/009,613

[22] Filed: Jan. 20, 1998

[30] Foreign Application Priority Data

Jan. 22, 1997 [JP] Japan .................................. 9-026147

[51] Int. Cl.⁶ ................................................. B23K 9/095
[52] U.S. Cl. .................................. 219/130.33; 219/137 PS
[58] Field of Search ................... 219/130.21, 130.31, 219/130.32, 130.33, 137 PS

[56] References Cited

U.S. PATENT DOCUMENTS

| | | | |
|---|---|---|---|
| 3,792,225 | 2/1974 | Needham et al. | 219/130.21 |
| 4,349,720 | 9/1982 | Mäkimaa | 219/130.33 |
| 5,272,314 | 12/1993 | Moriguchi et al. | 219/130.33 |
| 5,457,300 | 10/1995 | Karino et al. | 219/130.32 |

*Primary Examiner*—Clifford C. Shaw
*Attorney, Agent, or Firm*—William H. Murray

[57] ABSTRACT

DC power from a smoothing capacitor is converted into high frequency power by an inverter, and then lowered by an output transformer. The lowered high frequency power is converted into DC power by an output rectifier and a DC reactor, and then supplied to a load. The load is short-circuited and then opened to initiate arcing. The short-circuiting and the arcing alternate. An auxiliary rectifier provides a load-voltage representative signal, and a current detector detects a load current. A load-current representative signal is differentiated by a differentiation circuit. The signals from the auxiliary rectifier, the current detector and the differentiation circuit, and a reference signal are applied to an operational amplifier. A control circuit controls the inverter such that the output of the operational amplifier can be zero. An integration circuit receives at least the load-voltage representative signal to detect a period of a cycle consisting of the arcing and the short-circuiting and provide an operation-cycle-period representative signal to the operational amplifier.

3 Claims, 3 Drawing Sheets

CONSUMABLE ELECTRODE DC ARC WELDER

This application is based on Japanese Patent Application No. HEI 9-26147 filed on Jan. 22, 1997, which is incorporated hereinto by reference.

This invention relates to consumable electrode DC arc welders, such as $CO_2$ welders, MAG welders and MIG welders.

BACKGROUND OF THE INVENTION

In a consumable electrode DC arc welder, constant-voltage controlled power is supplied to a load which is constituted by a continuously fed, consumable welding rod electrode and a workpiece to be wrought by the welder. The welding rod electrode and the workpiece are short-circuited, and, then, the welding rod electrode is removed off the workpiece, whereby arc is generated between the electrode and the workpiece. The short-circuiting and the arcing are alternated for welding.

The consumable electrode DC arc welder also has a large DC reactor disposed in an output side of the welder. The DC reactor prevents current supplied to the load, i.e. load current, from rising abruptly, to thereby reduce spatters from a melted portion of the welding rod electrode. Spatters could be caused by excessive load current flowing during short-circuiting. A large DC reactor, however, hinders downsizing of the welder.

U.S. Pat. No. 5,457,300 assigned to the same assignee of the present application shows a consumable electrode DC arc welder in which load current flowing during short-circuiting is reduced to thereby reduce spatters, without causing any insufficient supply of load current during transition to arcing, whereby welding failure is prevented.

The DC arc welder according to U.S. Pat. No. 5,457,300 is described below with reference to FIG. 1. This U.S. Pat. No. 5,457,300 is also incorporated into the present application by reference. The welder has input terminals 1a, 1b and 1c to which AC power is supplied from e.g. a three-phase commercial AC power supply of a rated voltage of 200V. The AC power is rectified by an input rectifier 2 comprising e.g. bridge-connected diodes, and then smoothed by a smoothing capacitor 3 into DC power. The DC power is supplied to an inverter 4 comprising semiconductor switching elements, such as IGBTs and FETs, connected in bridge. The inverter 4 is pulse-width-modulation (PWM) controlled by an inverter control circuit 5 such that the switching elements are switched at a high frequency, thereby generating high-frequency power. The high-frequency power is lowered by an output transformer 6. The lowered high-frequency power is induced in a secondary winding 6s of the transformer 6.

The induced, lowered high-frequency power is rectified by an output rectifier 7 comprising e.g. bridge-connected diodes, and then supplied, via a smoothing and current-controlling DC reactor 8, between output terminals 9p and 9n. That is, conversion to DC power is provided also in an output side of the welder. The output terminal 9p is more positive than the output terminal 9n, and connected to a welding rod electrode 11 via an insulated cable 10p. The welding rod electrode 11 is wound in the form of a coil 12 and is continuously fed by a feeding device 13. The output terminal 9n is connected via an insulated cable 10n to a workpiece 14 to be wrought by the welder. The workpiece 14 and the welding rod electrode 11, constituting a load 15, are short-circuited, and, then, the welding rod electrode 11 is removed from the workpiece 14, so that arc is generated therebetween.

During welding operation, a voltage between the output terminals 9p and 9n, i.e. a load voltage V, changes as shown in FIG. 3(a), and current flowing through the load 15, i.e. load current I, changes as shown in FIG. 3(b). In FIG. 3, Ta denotes an arcing period, and Ts denotes a short-circuiting period.

The output transformer 6 has an auxiliary winding 6a in addition to the secondary winding 6s. An output voltage across the auxiliary winding 6a is rectified by an auxiliary rectifier 16. The auxiliary rectifier 16 provides a negative auxiliary signal Sv related to the load voltage V, to an inverting input terminal of an operational amplifier 18 through a resistor 17. A non-inverting input terminal of the operational amplifier 18 is grounded. A feedback resistor 19 is connected between the inverting input terminal and the output terminal of the operational amplifier 18.

The inverting input terminal of the operational amplifier 18 receives a reference signal, e.g. a reference voltage Sr, from a reference voltage source, e.g. a battery 21, through a resistor 20.

A current detector 22 detects the load current I and provides a load-current representative signal. The load-current representative signal is differentiated by a differentiation circuit 25 which comprises a resistor 23 and a capacitor 24 connected in series. The differentiation circuit 25 provides a differentiation output Idif, representing variations of the load current. The differentiation output Idif abruptly rises immediately after the beginning of the short-circuiting period and then gradually decreases, as shown in FIG. 3(c). It abruptly falls in the beginning portion of the arcing period and then gradually recovers. This differentiation output Idif is processed by an operational amplifier 26 with a feedback resistor 27. The operational amplifier 26 provides a negative signal Sx to the inverting input terminal of the operational amplifier 18 via a resistor 28. Thus, an input signal Sei applied to the inverting input terminal of the operational amplifier 18 is equal to (Sr−Sv−Sx). The operational amplifier 18, serving as an error amplifier, provides the inverter control circuit 5 with an error signal Se in accordance with the input signal Sei. The control circuit 5 controls the inverter 4 to change the output of the inverter, hence, the output of the welder, in such a manner that the signal Se can be cancelled, whereby the output of the welder is stabilized.

The input signal Sei applied to the inverting input terminal of the operational amplifier 18 abruptly falls immediately after the beginning of the short-circuiting period and then gradually recovers, as shown in FIG. 3(d). With a higher rate of increase of the load current I, the differentiation output Idif increases accordingly, which increases the signal Sx and, therefore, the input signal Sei decreases. This reduces the load voltage V and the load current I, thereby preventing spatters. The level of the input signal Sei rises in the beginning of the arcing period, and then decreases gradually.

If the workpiece 14 is a thick board, for example, the load current I has a higher rate of decrease and the differentiation output Idif has a reduced level, so that the correction signal Sx decreases. Thus, the input signal Sei has a higher level, so that the load voltage V and the load current I are increased. This increases supply of heat to the load, which can provide a strong weld of a large area. In contrast, if the workpiece 14 is a thin board, the load current I has a lower rate of decrease and the differentiation output Idif also has a lower level. Thus, the load current I is suppressed and the workpiece 14 can be prevented from being excessively melted.

A user may change the type, attitude and/or feeding speed of the welding rod electrode 11, depending on the material, size and the like of the workpiece, for example, and accordingly change the values of the resistors 23 and 28. This causes the rising and falling edges of the signal Sx to occur earlier as represented by a long dashed line in FIG. 4, or later as represented by an alternate long and short dashed line in FIG. 4, than the initial state as represented by a solid line in FIG. 4. In other words, the period of a cycle consisting of short-circuiting and arcing, and, therefore, the period of the load voltage V become longer or shorter. Therefore, for example, if a user initially sets the reference voltage Sr to such a value that the average load voltage of 20V is obtained, the average of the load voltage V applied during welding may change to 19V or 21V.

The object of the present invention is to provide a consumable electrode DC arc welder in which variations in period of the load voltage can be compensated for so that the load voltage can be maintained constant.

SUMMARY OF THE INVENTION

A consumable electrode DC arc welder according to the present invention comprises a DC power supply for providing DC power, an inverter for converting the DC power to high frequency power, and a transformer for transforming the high frequency power. The transformed high frequency power is converted into DC power by a DC-converter, which supplies the DC power to a load comprising a welding rod electrode of the welder and a workpiece to be wrought by the welder. The welding rod electrode and the workpiece are alternately brought into contact with each other for short-circuiting and separated from each other for initiation of arcing. A voltage detection unit detects a load voltage applied to the load and provides a load-voltage representative signal. A current detection unit detects load current flowing through the load and provides a load-current representative signal. A load-current-variation detection unit receives the load-current representative signal to detect variations of the load current and provide a load-current-variation representative signal. An operation-cycle-period detection unit receives at least the load-voltage representative signal and detects the period of an operation cycle consisting of arcing and short-circuiting. The cycle-period detection unit provides an operation-cycle-period representative signal. A control unit receives the load-voltage representative signal, the load-current-variation representative signal, the operation-cycle-period representative signal and a reference signal and controls the inverter so that the sum of the load-voltage representative signal, the load-current-variation representative signal and the operation-cycle-period representative signal can be equal to the reference signal. The cycle-period detection unit may be arranged such that the cycle-period representative signal is substantially zero when the cycle period is equal to a predetermined period and has a polarity which changes in accordance with the difference between the detected cycle period and the predetermined period. Thus, the cycle period and the average of the load voltage provided during welding can be maintained constant.

The cycle-period representative signal changes in value in accordance with the difference between the detected cycle period and the predetermined period. The cycle-period representative signal is applied to the control unit, which controls the inverter so that the difference of the period can be cancelled. The values of the load voltage and the load current can be controlled similarly to the prior art consumable electrode DC arc welder shown in FIG. 1 because the load-voltage representative signal and the load-current-variation representative signal as well as the cycle-period representative signal are applied to the control unit.

The cycle-period detection unit may receive the load-voltage representative signal with a reference signal attributable component removed therefrom.

The load-voltage representative signal contains a DC component, which corresponds to the reference signal attributable component. The load-voltage representative signal with the DC component removed therefrom is applied to the cycle-period detection unit. In other words, only an AC component of the load-voltage representative signal is applied to the cycle-period detection unit. This results in more precise detection of the period of the load voltage, so that the average of the load voltage can be more precisely maintained constant.

DETAILED DESCRIPTION OF PREFERRED EMBODIMENT

Figure 1:
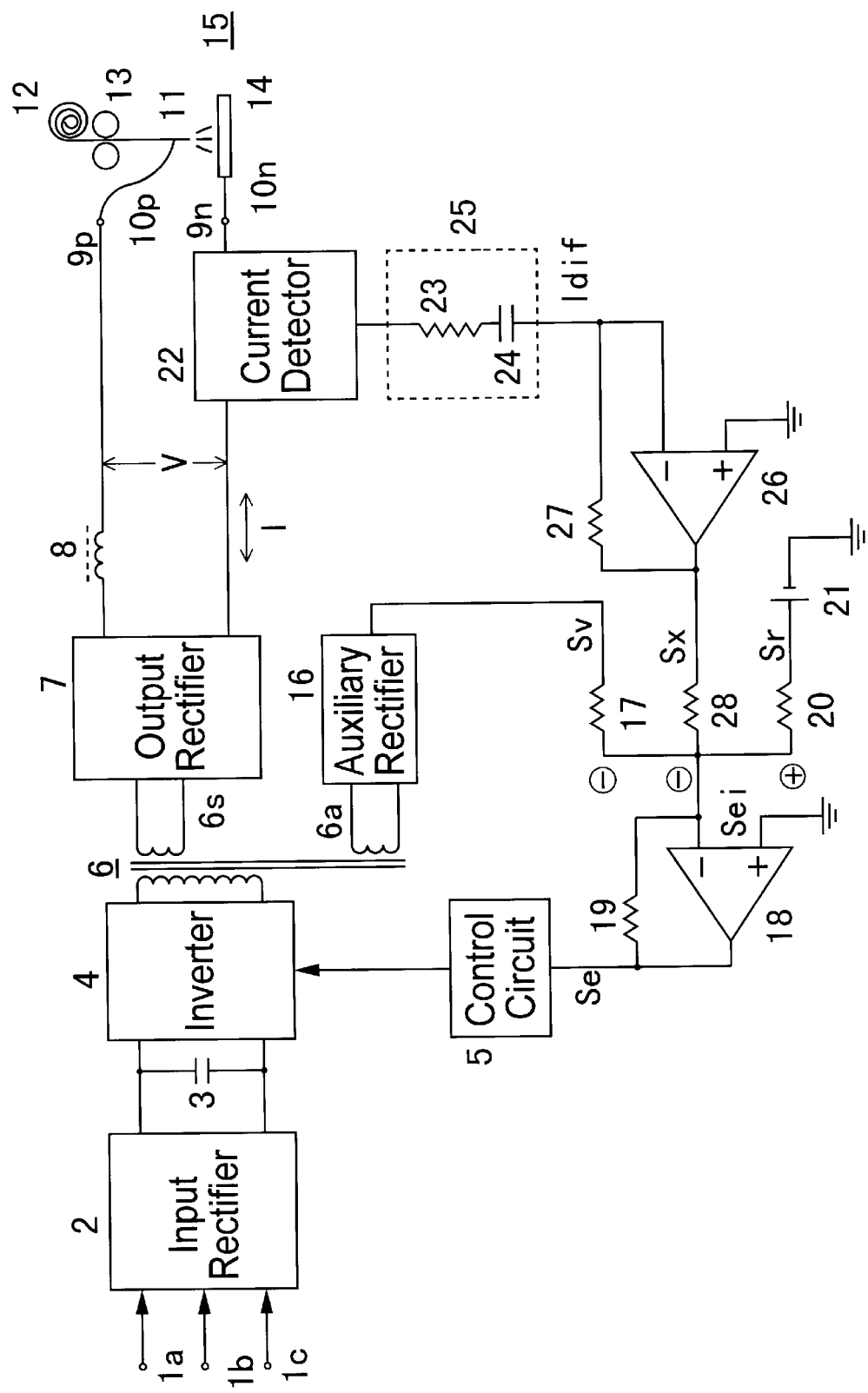
FIG. 1 is a block diagram of a prior art consumable electrode DC arc welder.

A consumable electrode DC arc welder according to an embodiment of the present invention is described below with reference to FIG. 2. The welder of the present invention shown in FIG. 2 is similar to the prior art welder shown in FIG. 1, and, therefore, the same reference numerals are used for similar components and functions. Explanations thereof are, therefore, not given.

An input rectifier 2 and a smoothing capacitor 3 constitute the DC power supply referred to in the SUMMARY OF THE INVENTION. A voltage-transformer 6 constitutes the transformer. An output rectifier 7 and a DC reactor 8 constitute the DC-converter. An auxiliary rectifier 16 constitutes the voltage detection unit, a current detector 22 constitutes the current detection unit, a differentiation circuit 25 constitutes the load-current-variation detection unit, and an operational amplifier 18 and a control circuit 5 constitute the control unit.

The illustrated embodiment of the present invention includes an operational amplifier 37. The operational amplifier 37 has an inverting input terminal to which the negative auxiliary signal Sv is applied from the auxiliary rectifier 16 through a resistor 35. Also, the positive reference voltage Sr is applied from the battery 21 through a resistor 36 to the inverting input terminal. Thus, the inverting input terminal of the operational amplifier 37 receives a signal Sr–Sv. The signal Sr–Sv is equal to the auxiliary signal Sv with a DC component (corresponding to Sr) removed therefrom, and, therefore, represents the AC component of the signal Sv.

A non-inverting input terminal of the operational amplifier 37 is grounded. A series circuit of a resistor 38 and a capacitor 40 is coupled between the inverting input terminal and the output terminal of the amplifier 37. Thus, the operational amplifier 37 serves as an integration circuit.

The output signal Sy is applied to the inverting input terminal of the operational amplifier 18.

Figure 2:
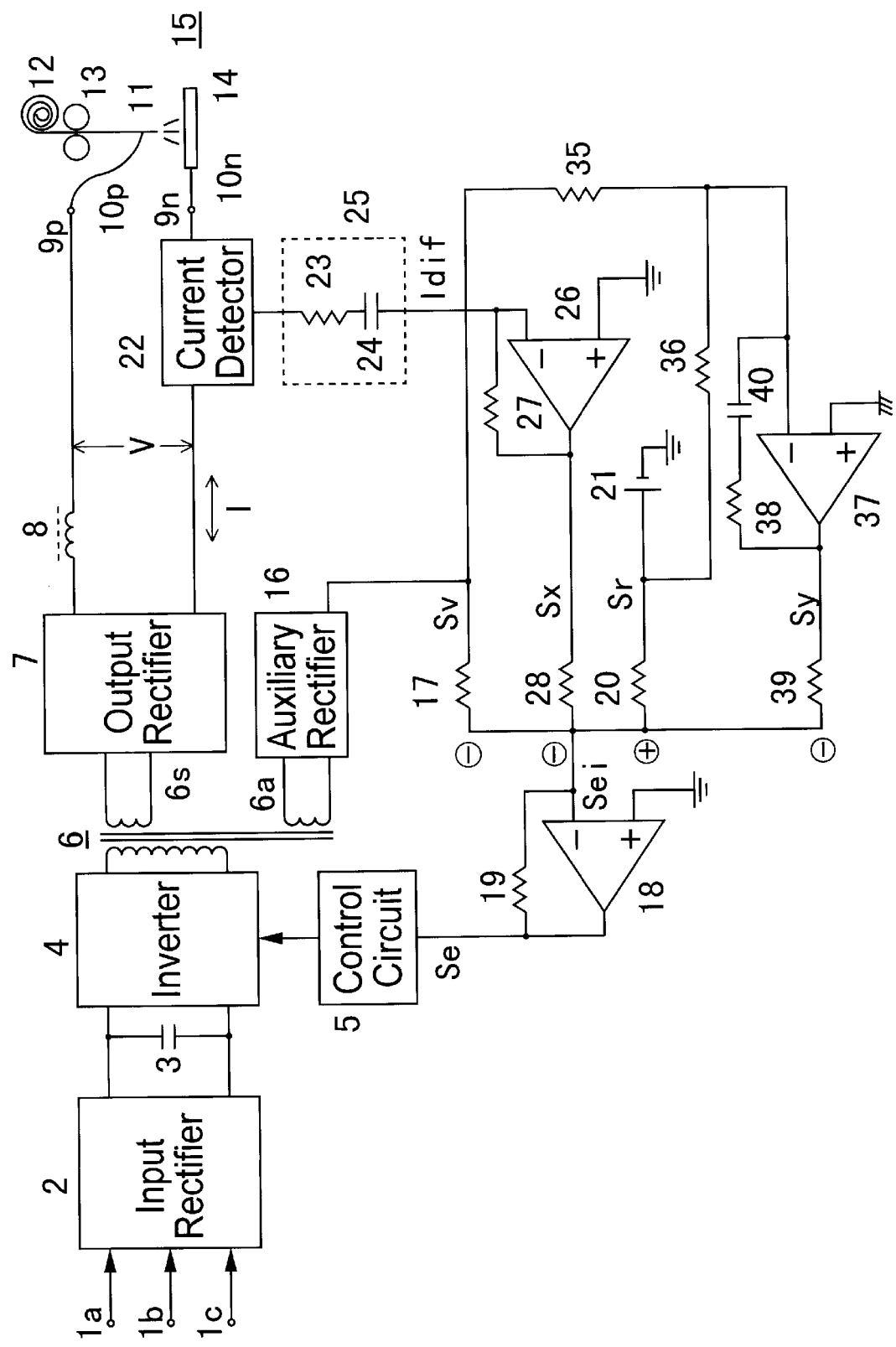
FIG. 2 is a block diagram of a consumable electrode DC arc welder according to one embodiment of the present invention.
Figure 3:
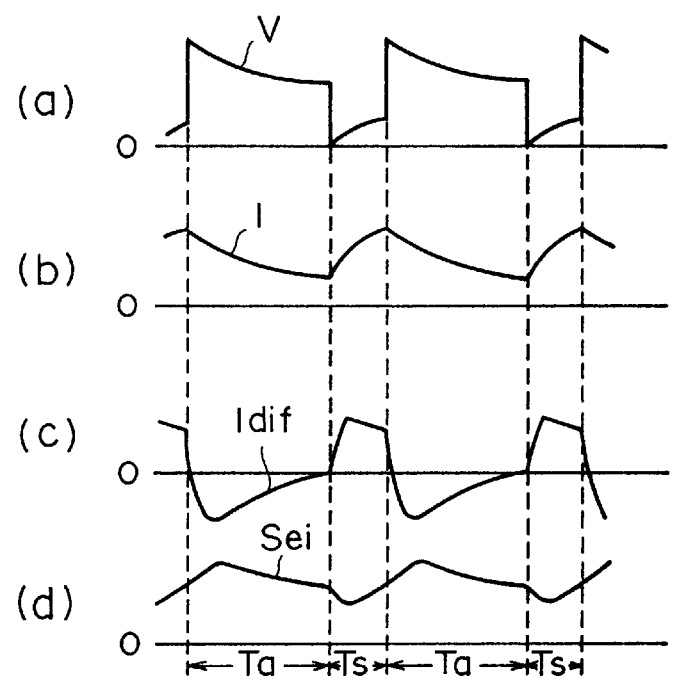
FIG. 3 shows waveforms of output signals appearing at various portions of the welder shown in FIG. 1.
Figure 4:
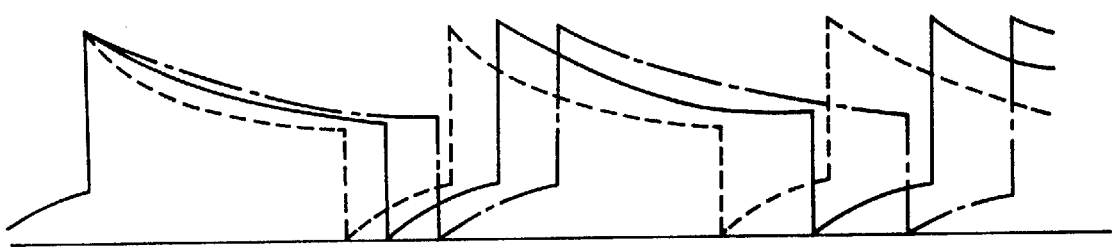
FIG. 4 illustrates variations of the load voltage of the welder shown in FIG. 1.

The operational amplifier 18 operates in a similar manner to the one in the prior art arc welder shown in FIG. 1 because the values of the resistor 38 and the capacitor 40 are selected such that the output signal Sy of the operational amplifier 37 can be zero when the period of the operation cycle is the initially set period. As stated above, however, a user may change the rising edge and the falling edge of the output signal of the differentiation circuit 25, so that the period of the operation cycle of the welder becomes longer or shorter than the initially set period.

When the period of the operation cycle becomes shorter, the average of the load voltage becomes higher, which causes the auxiliary signal Sy to become positive. Thus, the input signal Sei applied to the inverting input terminal of the operational amplifier 18 becomes higher by the value of the auxiliary signal Sy. To compensate for this, the operational amplifier 18 provides the control circuit 5 with an output signal Se such that the period of the operation cycle can be returned to the initially set period. Thus, the average of the load voltage returns to the initially set value.

In contrast, when the period of the operation cycle becomes longer, the average of the load voltage becomes lower, which causes the auxiliary signal Sy to become negative. Thus, the input signal Sei to the operational amplifier 18 becomes lower by the value of the auxiliary signal Sy. To compensate for this, the operational amplifier 18 provides the control circuit 5 with such an output signal Se that the period of the operation cycle can be corrected to the initially set period. This brings the average of the load voltage back to the initially set value.

The arc welder according to the illustrated embodiment includes a device for detecting variations in the period of the operation cycle, which comprises the operational amplifier 37. Therefore, variations in the operation cycle period can be compensated for and the load voltage can be always maintained constant.

In the described embodiment, the operational amplifier 37 serves as the integration circuit, but an integration circuit comprising a capacitor and a resistor may be used, instead.

What is claimed is:

1. A consumable electrode DC arc welder comprising:

a DC power supply for providing a DC power;

an inverter for converting the DC power into high frequency power;

a transformer for transforming the high frequency power;

a DC-converter for converting the transformed high frequency power into DC power and providing the resulting DC power to a load consisting of a welding rod electrode of the welder and a workpiece to be wrought by the welder, said welding rod electrode and said workpiece being alternately short-circuited and separated from each other for arcing;

a voltage detection unit for providing a load-voltage representative signal related to a load voltage applied to the load;

a current detection unit for providing a load-current representative signal representing load current flowing through the load;

a load-current-variation detection unit receiving the load-current representative signal for detecting variations in the load current to provide a load-current-variation representative signal;

an operation-cycle-period detection unit receiving at least the load-voltage representative signal for detecting a period of an operation cycle consisting of the arcing and the short-circuiting and providing an operation-cycle-period representative signal; and a control unit receiving the load-voltage representative signal, the load-current-variation representative signal, the operation-cycle-period representative signal, and a reference signal, for controlling the inverter such that the sum of the load-voltage representative signal, the load-current-variation representative signal and the operation-cycle-period representative signal can be equal to the reference signal.

2. The consumable electrode DC arc welder according to claim 1 wherein the operation-cycle-period detection unit receives the load-voltage representative signal with a DC component removed therefrom.

3. The consumable electrode DC arc welder according to claim 1 wherein the operation-cycle-period detection unit is an integration circuit for integrating the load-voltage representative signal with a DC component removed therefrom.

* * * * *